United States Patent [19]
Nishizawa

[11] Patent Number: 5,877,917
[45] Date of Patent: *Mar. 2, 1999

[54] FLOPPY DISK UNIT

[75] Inventor: Hiroshi Nishizawa, Hanamaki, Japan

[73] Assignee: Matsushita Electric Industrial Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 740,061

[22] Filed: Oct. 24, 1996

Related U.S. Application Data

[62] Division of Ser. No. 264,909, Jun. 24, 1994, Pat. No. 5,610,780.

[30] Foreign Application Priority Data

Jun. 30, 1993 [JP] Japan ................................ 5-162120
Jun. 30, 1993 [JP] Japan ................................ 5-162121

[51] Int. Cl.⁶ ........................................... G11B 21/02
[52] U.S. Cl. ................................ 360/99.01; 360/99.04
[58] Field of Search ........................... 360/99.01, 78.12, 360/78.13, 99.02–99.05

[56] References Cited

U.S. PATENT DOCUMENTS

| | | | |
|---|---|---|---|
| 4,079,277 | 3/1978 | Osanai | 310/90 |
| 4,992,893 | 2/1991 | Kanai et al. | 360/78.13 |
| 5,038,240 | 8/1991 | Isomura | 360/99.08 |
| 5,043,837 | 8/1991 | Okamura | 360/135 |
| 5,333,084 | 7/1994 | Galloway et al. | 360/77.07 |

FOREIGN PATENT DOCUMENTS

| | | |
|---|---|---|
| 62-54584U | 4/1987 | Japan . |
| 437338Y2 | 1/1988 | Japan . |
| 64-23767U | 2/1989 | Japan . |
| 64-35532U | 3/1989 | Japan . |
| 1-146172 | 6/1989 | Japan . |
| 4147470A | 5/1992 | Japan . |
| 4195762A | 7/1992 | Japan . |
| 4-241273 | 8/1992 | Japan . |
| 541012A | 2/1993 | Japan . |

*Primary Examiner*—William J. Klimowicz
*Attorney, Agent, or Firm*—Stevens, Davis, Miller & Mosher, L.L.P.

[57] ABSTRACT

A floppy disk unit rotates a recording medium loaded thereon and reads information from or records information on the medium with magnetic heads. The unit is provided with an adjustment portion for adjusting beforehand portions of the magnetic heads with respect to the medium. The adjustment portion is arranged in a position where it is prevented from being vertically overlapped with the loaded medium so that adjustment of the unit can be performed from above easily and reliably in a stable manner.

11 Claims, 5 Drawing Sheets

FLOPPY DISK UNIT

This is a division of application Ser. No. 08/264,909 filed Jun. 24, 1994, now U.S. Pat. No. 5,610,780.

BACKGROUND OF THE INVENTION

The present invention relates to improvements in a floppy disk unit which is to be used as an external storage device such as a personal computer and a word processor.

Electronic equipments such as a personal computer having been made more highly efficient and smaller increasingly in recent years. With this tendency, it is demanded that floppy disk units are made further smaller in size and produced at a lower cost. Concerning the dimensions of a floppy disk unit, there is a limit in miniaturization of the shape in plan on account of the standardized dimensions of a recording medium that is called a floppy disk or diskette. On the other hand, height of the unit greatly depends on a magnetic head, a driving mechanism, a floppy disk loading/unloading mechanism and a rotary driving device so that these components are considered as the object of improvement for realizing the miniaturization.

The rotary driving device of the floppy disk unit generally adopts an oilless metal of powdered sintered alloy as a bearing member. The oilless metal is press-fitted in a holder or housing of a bearing portion and, thereafter, subjected to sizing work to meet required dimensions. The oilless metal is suitable to make the floppy disk rotate in stable manner, and however, in order to provide a holding force large enough to tolerate the sizing work by press-fitting, a certain length is needed, with the result that the bearing portion is prevented from being made smaller in size. Examples of the sizing work for electric motors are seen in, for instance, Japanese Utility Model Unexamined Publication Nos. 62-54584, 64-23767 and 64-35532.

Further, in order to keep compatibility, it is necessary for the floppy disk unit to adjust the position of magnetic heads with respect to the floppy disk at the manufacturing stage. The floppy disk unit is provided with an adjustment portion for this purpose. Heretofore, for the rotating position of the floppy disk, an alignment medium has been used in which the angle is represented by time and a reference signal for adjustment called "index burst" or "time burst" is written, and adjustment has been effected by loading this medium in the floppy disk unit. In other words, the timing adjustment has been effected by the adjustment portion in response to the signal read out from the alignment medium.

In general, the floppy disk unit is constructed such that a motor and a motor driving electric circuit are located under the disk or medium. The above-described adjustment portion is usually provided on the motor driving circuit so that access to this adjustment portion must be made from below the unit. On the other hand, in the manufacturing line, since it is efficient and accurate to carry out a job from above the unit, connecting pins for power supply and signals are connected to connection terminals of each unit from above so as to make each magnetic head move to a required track of the alignment medium to read the signals. In this way, in accordance with the readout signals through the connecting pins connected from above, the adjustment portion is operated from below to thereby effect the index adjustment.

However, if the adjustment portion is located in a position where it is overlapped with the loaded alignment medium as described above, the connecting pins have to be handled from above while the adjustment portion must be adjusted from below. This gives rise to the following problems. Since the adjusting operation is usually performed in a state that the floppy disk unit is put on a pallet, it is necessary to form in each pallet a hole for adjustment to be performed from below. Further, an adjusting tool, for example, a screw driver, must be inserted through a small hole formed in a circuit board so as to be engaged with the adjustment portion, and however, this engagement is not easy and hence the adjusting operation cannot be performed smoothly.

As another prior art, there has been known a floppy disk unit in which an adjustment portion for index signal is so provided as to face upward for the purpose of making it possible to perform the adjustment only by the operation from above. Such a unit is seen in, for example, Japanese Utility Model Examined Publication No. 4-37338. However, this adjustment portion is adapted to detect not the alignment medium but the rotational position of the rotor of a motor.

SUMMARY OF THE INVENTION

The present invention has been accomplished in view of the problems described above, and an object of the invention is to provide a floppy disk unit which can be reduced in height and cost.

Another object of the invention is to provide a floppy disk unit which makes a bearing portion thinner and has substantially no projecting portion for fixation of the bearing portion to enable reduction of height of the unit and which can decrease the number of manufacturing steps and the number of component parts to be reduced in cost and weight.

Still another object of the invention is to provide a floppy disk unit in which the aforesaid adjusting operation can be performed easily and reliably and which does not involve an increase of cost.

A further object of the invention is to provide a floppy disk unit in which a thin bearing portion is provided so as to make the overall dimension of the unit smaller and the adjusting operation can be performed easily and which can be improved in quality and reduced in cost.

To achieve the above objects, the invention is intended to fix an oil-impregnated metal bearing member by means of caulking to provide a necessary holding force and to arrange an adjustment portion in a proper position where access thereto is not hindered by a loaded medium to enable the adjustment operation to be performed from above easily and reliably in stable manner.

According to an aspect of the invention, a floppy disk unit for rotating a medium loaded thereon to read and write information comprises bearing means for rotatably supporting the medium and a metal support plate. The bearing means includes a bearing member made of sintered alloy, and the bearing member has an end portion and a band-like projection formed along the edge of the end portion. The support plate is formed therein with a through hole in which the end portion of the bearing member is fitted with the projection thereof projected out from one of surfaces of the support plate, the through hole has a large diameter portion along an opening edge thereof in the one surface, which is larger in diameter than other portions of the through hole, so that the large diameter portion provides, between the through hole and the end portion of the bearing member fitted therein, a gap in which the band-like projection is caulked and fills to fix the bearing member to the support plate.

With the above structure, by caulking the band-like projection of the bearing member to fill the gap between the bearing member and the through hole of the support plate with the caulked projection, the bearing member is fixed to the support plate and a holding force necessary for sizing work can be produced. Press-fitting and a length therefor are not required so that the length of the bearing member and, therefore, the height of the bearing portion can be reduced. Further, no screw or bolt is required to fix the bearing member so that the bearing portion has only a few projections. As a result, it is possible to make the whole unit thinner and, owing to reduction in the number of working steps and the number of component parts, the unit can be reduced both in cost and in weight.

It is preferred that the through hole of the support plate is formed by press work and a shear-droop or roll-over portion caused as a result of the press work serves as the large diameter portion of the through hole. The through hole and the large diameter portion thereof can be formed at a time, and the working process is further simplified.

Preferably, the dimensions of the projection of the bearing member and the size of the large diameter portion of the support plate, that is, the amount of the material to be caulked and the volume of the void space for receiving it are so set as to make the projection after being caulked and the one surface of the support plate substantially flush with each other. Substantially no projecting portion is resulted from fixation of the bearing member is nearly extinguished, thereby enabling the unit to be made further thinner.

It is preferred that the bearing means includes a ball bearing and a fitting hole for the ball bearing is formed in the opposite end portion of the bearing member. The bearing member serves as a housing or holder for retaining the ball bearing as well so that the number of component parts can be further decreased. In this case, the bearing member is preferably made of a copper-base sintered alloy. It is easy to attain the dimensional accuracy with the copper-base sintered alloy so that the degree of concentricity between the bearing fitting hole and the bearing member can be increased to improve the accuracy of deflection of the bearing.

It is preferred that the support plate is made of a magnetic material, that is, either iron or silicon steel, and a circuit board is provided on the one surface of the support plate. The number of component parts of a rotary driving system is further decreased, thereby enabling a further reduction in the cost of the unit.

According to another aspect of the invention, a floppy disk unit for rotating a medium loaded therein to read and write information comprises rotary driving means for rotating the medium in engagement therewith, magnetic head means provided movably with respect to the medium for reading and writing information, and adjust means for effecting timing adjustment of index signal. The adjust means is arranged to be prevented from being overlapped with the medium engaged with the rotary driving means as viewed in plan.

With the above structure, access to the adjust means is not hindered by the loaded medium, and accordingly, timing adjustment of index signal can be performed easily and reliably in stable manner.

Preferably, support means is disposed below the medium loaded in the unit, a portion of the support means extends to a position where it is prevented from being overlapped with the medium as viewed from above, and the adjust means is mounted on the extended portion of the support means. All access to the unit including access to the adjust means and, further, electrical connection to the unit can be performed from above the unit, and accordingly, it is possible to improve the quality of and reduce the cost of the floppy disk unit.

It is preferred that the medium is loaded to be close to one side in a chassis of the unit so as to provide an empty space on the other side and the adjust means is disposed in this empty space.

BRIEF DESCRIPTION OF DRAWINGS

FIGS. 2a and 2b show essential portions of a bearing of the unit of FIG. 1, in which

DESCRIPTION OF EMBODIMENTS

Figure 1:
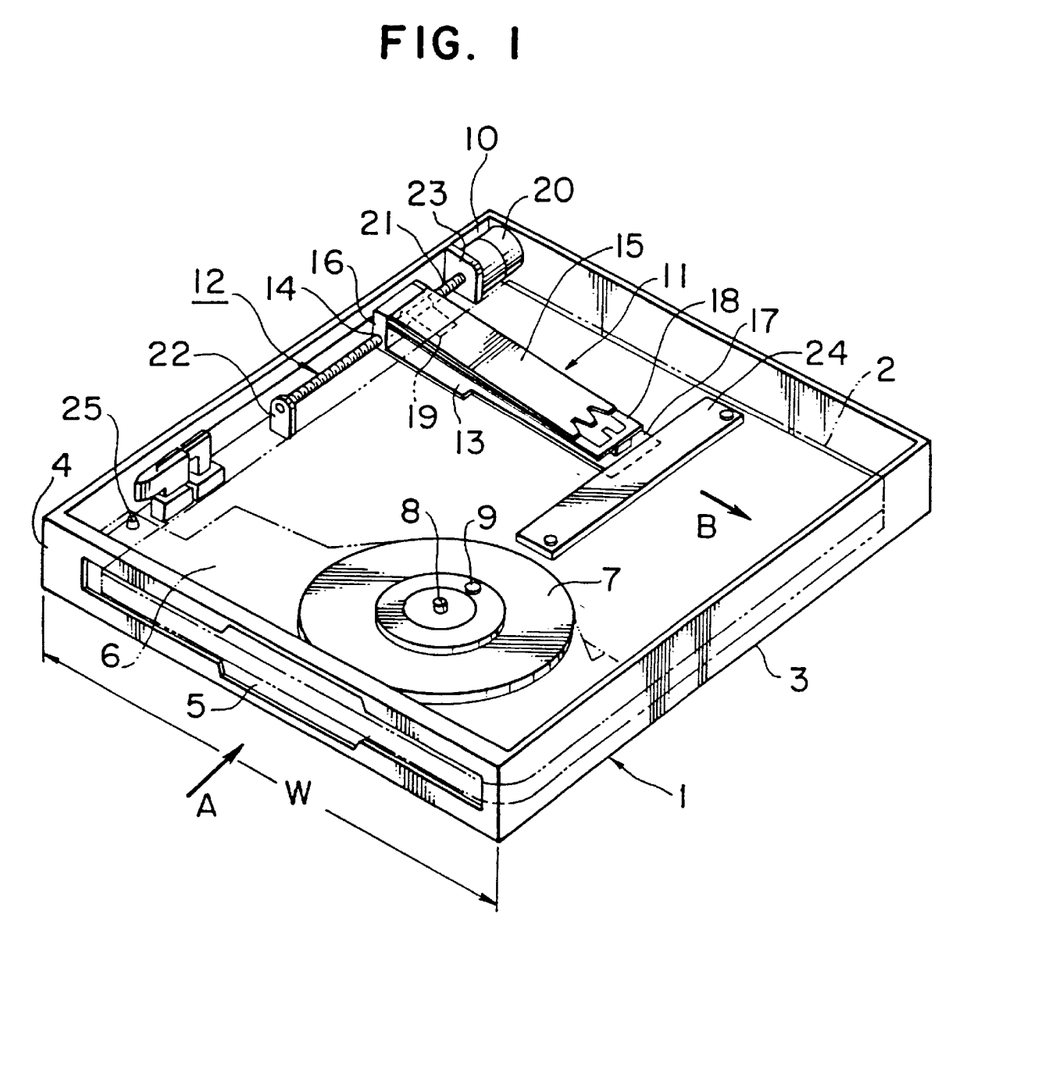
FIG. 1 is a perspective view showing a floppy disk unit according to an embodiment of the invention.

Referring to FIG. 1, the floppy disk unit according to an embodiment of the invention is generally denoted by reference numeral 1, and it is shown in the state that an index adjusting alignment medium 2 has been loaded therein. The medium 2 is of a structure that a rotating recording disk is received in a jacket and has the same shape as a so-called working medium used for write/read or, in the illustrated embodiment, a 3.5 inch floppy disk.

The floppy disk unit 1 has a flat box shaped chassis 3 which forms the outer covering of or defines the contour of this unit, and various component parts are installed in this chassis. The chassis 3 includes a front panel 4 in which an insertion entrance 5 for the medium 2 is formed. A metal support plate 6 is attached to the inside of the chassis 3 and a spindle motor 7 serving as a rotary driving device is mounted on this support plate. On the support plate 6, a circuit pattern of a motor driving system (not shown) is formed through a resin layer (not shown) and circuit components of the motor driving system (not shown) are mounted. The motor 7 has a rotary shaft 8, and a connecting member 9 to be engaged with a hub of the medium 2 is so provided as to be rotated with the shaft 8.

A holder and a driving mechanism (both not shown) for the medium 2 are provided operatively in the chassis 3. As the medium 2 is inserted through the insertion entrance 5, it is received by the holder. Subsequently, the driving mechanism is operated to move forward toward the insertion entrance 5 to make the holder and the medium 2 come down until the hub of the medium 2 is engaged with the rotary shaft 8 and the connecting member 9 of the spindle motor 7. Conversely, when the driving mechanism is operated to move back, the holder is caused to go up with the medium 2 so that the hub of the medium 2 is out of the engagement with the rotary shaft 8 and the connecting member 9 of the motor 7, and then, the medium 2 is pushed out so that it is partially projected out from the holder and the insertion entrance 5. The holder and the driving mechanism are arranged such that the medium 2 is located close to one side in the chassis 3 while an empty cavity or space 10 is formed on the other side in the chassis 3. The holder and the driving mechanism may have the same structures as those of the prior art, and therefore, no further description thereof will be made herein. Such a holder is shown in Japanese Patent Unexamined Publication No. 4-195762.

The chassis 3 is further provided therein with a head support device 11 and a head positioning deice 12. The device 11 is arranged in the direction crossing the longitudinal axis of the medium 2 loaded in the unit, while the device 12 is arranged in the room or empty space 10 along the direction in which the medium 2 is to be loaded and unloaded.

The head support device 11 comprises an elongated carriage 13, a guide block 14, a head arm 15 and a roll plate 16. The carriage 13 extends at a substantially right angle to the direction in which the medium 2 is to be loaded and unloaded, with the free end of the carriage lying above the longitudinal axis of the medium 2 and its basal end lying in the empty space 10. The head arm 15 also extends along the carriage 13 likewise. The guide block 14 is fixed to the basal end of the carriage 13, and the head arm 15 is also attached at the basal end thereof to the guide block 14 through the roll plate 16. The roll plate 16 is made of a leaf spring so that the head arm 15 is pivotally movable up and down about the guide block 14. A first magnetic head 17 for side 0 is attached to the upper surface of the free end of the carriage 13 and a second magnetic head 18 for side 1 is attached to the lower surface of the free end of the head arm 15, so that both magnetic heads are opposed to each other. The head arm 15 and the second magnetic head 18 are pushed toward the carriage 13 and the first magnetic head 17 by means of a load spring 19.

The head positioning device 12 comprises a stepping motor 20 and a lead screw 21. The stepping motor 20 is mounted in the corner within the chassis 3, and the lead screw 21 is rotatably supported by supports 22, 23 and extends along the side of the chassis 3. The lead screw 21 is formed in one united body with the rotary shaft of the motor 20, and the guide block 14 of the device 11 is engaged with the intermediate portion of the lead screw 21. A guide plate 24 is fixed to the bottom of the chassis 3, and the free end of the carriage 13 is engaged with the lower surface of the guide plate 24. The carriage 13 is normally pushed against the guide plate 24 by means of a resilient member (not shown) so as to be prevented from rotating about the guide block 14. As the motor 20 is driven to rotate the lead screw 21, the guide block 14 is moved along the lead screw 21 to move the carriage 13 and the head arm 15 horizontally. Thus, the first and second magnetic heads 17, 18 are moved in the radial direction of the rotating disk of the medium 2.

When the holder goes up as mentioned before, the head arm 15 and the second magnetic head 18 are rotated upwards against the load spring 19 not to be in contact with the medium 2. When the holder comes down, the head arm 15 is rotated downward by the righting elasticity of the spring 19 and the medium 2 is held between the first and second magnetic heads 17, 18.

Here, description will be made on improvements of the spindle motor 7 which is the rotary driving device. First to give a clear understanding of the improvements by the invention, FIG. 8 will be referred to.

Figure 8:
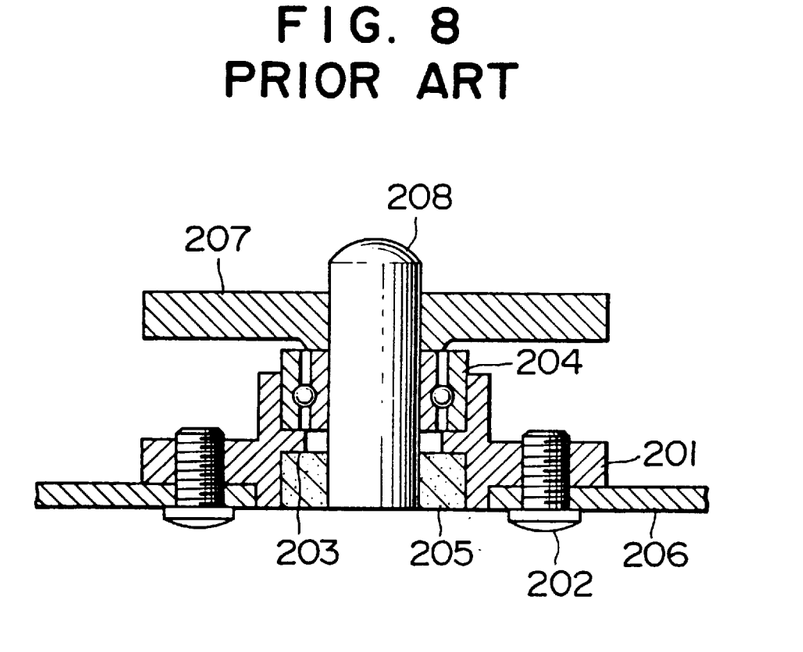
FIG. 8 is a sectional view showing essential portions of a bearing of a conventional floppy disk unit.

FIG. 8 shows essential portions of a conventional spindle motor. This motor has a flanged cylindrical housing 201. The housing 201 is fitted in a hole formed in a support plate 206 and fixed to the support plate with screws 202. A ring-shaped partition 203 is formed integrally with the inner wall of the housing 201 to divide the hollow portion of the housing into upper and lower parts. A ball bearing 204 is press-fitted in the upper hollow portion of the housing with its outer race fixed thereto, while an oil-impregnated metal 205 is press-fitted in and fixed to the lower hollow portion of the housing. A rotary shaft 208 is rotatably supported by the ball bearing 204 and the oil-impregnated metal 205. A bush 207 is fixed to the upper portion of the rotary shaft 208, and a rotor (not shown) is attached to the bush. Further, magnets (not shown) are attached to the inner peripheral surface of the rotor. On the other hand, a stator (not shown) is provided on the outer periphery of the housing 201 and a wound coil (not shown) is attached on the stator. Similar ones to the conventional structure described one seen in, for example, Japanese Patent Unexamined Publication Nos. 4-147470 and 5-41012.

The spindle motor, when an electric current is passed through the winding coil of the stator, rotates the rotor, the bush 207 and the rotary shaft 208 through the magnets of the rotor. With this rotation, the disk of the medium 2 engaged with the end of the rotary shaft 208 is rotated.

As described above, the oil-impregnated metal 205 is fixed to the housing 201 by press-fitting. Then, sizing is effected on the metal to attain required dimensions. Accordingly, as it is necessary to provide, through the press-fitting, a holding force larger than a turning moment exterted at the time of the sizing work, the length of the oil-impregnated metal 205 cannot be decreased. Additionally, the head portion of each screw 202 projects down, making it difficult all the more to lessen the overall thickness of the floppy disk unit. As concerns fixation of the housing, flush head screw may be used in place of the round head screws 202 to prevent the head portions of the screws from projecting out from the support plate. In this case, however, counter sinks must be formed in the support plate 206, resulting in an increase of the number of working steps. In any case, the number of component parts is large, the cost is high and the weight is heavy.

Figure 2A:
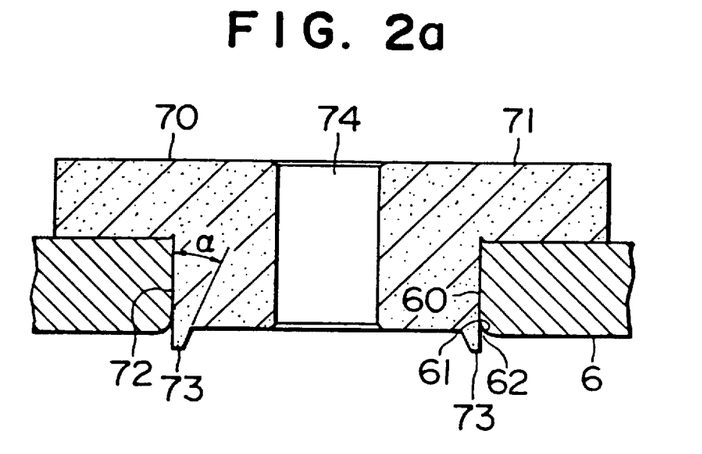
FIG. 2a is a sectional view showing a state before a bearing member is fixed to a support plate and FIG. 2b is a bottom view of the same.
Figure 2B:
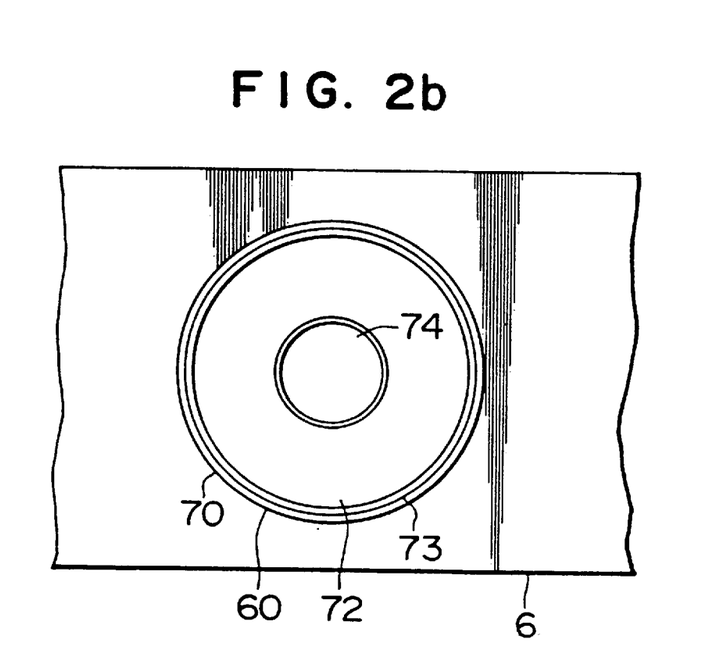

In the embodiment of the invention, as shown in FIG. 2a, the metal support plate 6 is formed therein with a through hole or fitting hole 60 by means of press work in such a manner that the hole 60 has a shear-drop or roll-over portion 61 caused along its periphery or opening edge in the lower surface of the support plate, namely a portion deformed in the edge of the hole as a result of the pressing by a boring tool. On the other hand, a bearing member 70 for the spindle motor 7 is made of an oil-impregnated metal of sintered alloy, and it has in its upper part a large diameter portion 71 which has an outside diameter larger than the diameter of the fitting hole 60, and in the lower part thereof a small diameter portion 72 which is to be fitted in the fitting hole 60. Further, a projection 73 serving as a caulking portion is formed at the lower end of the small diameter portion 72, a through hole 74 is formed in the center of the bearing member, and the bearing member 70 presents a stepped cylindrical shape as a whole. The caulking portion 73 is formed integrally with the small diameter portion 72 and, as shown in FIG. 2b, not only extends along the edge portion of the end face of the small diameter portion 72 in the form of a band or, in this embodiment, in the form of a ring but also projects down therefrom. The outer periphery of the band-like or ring-like caulking portion 73 extends straight so as to be coextensive with the outer peripheral surface of the small diameter portion 72, while the inner periphery thereof is inclined so as to increase the diameter as going downward. The angle α of this inclination is set to be an acute angle smaller than 90 degrees.

Figure 3:
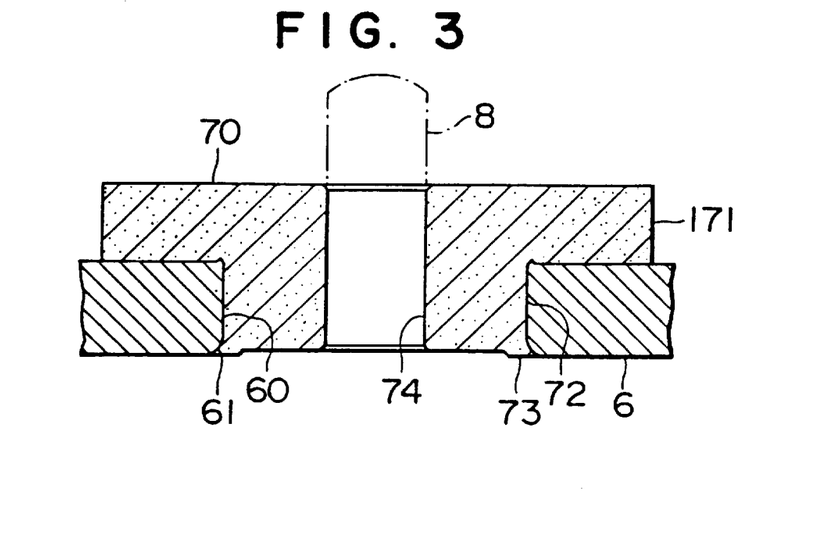
FIG. 3 is a sectional view showing the essential portions of the bearing of FIG. 2a in a state that the bearing member is fixed to the support plate.

When fixing the bearing member 70 to the support plate 6, the small diameter portion 72 is first fitted in the fitting hole 60 and the large diameter portion 71 rests on the upper surface of the support plate 6. Subsequently, the ring-like caulking portion 73 is caulked radially outwardly by means of for example a rotary caulking machine to fill up groove-like gap or a void space 62 between the shear-droop portion 61 and the small diameter portion 72 as indicated by chain line in FIG. 2a and, further, as shown in FIG. 3. In this way, the bearing member 70 is fixed to the support plate 6. Thereafter, the rotary shaft 8 is rotatably supported by the through hole 74 of the bearing member 70.

In the floppy disk unit having the above-described structure, as the alignment medium 2 is inserted through the insertion entrance 5 into the holder as indicated by an arrow A in FIG. 1, the aforesaid driving mechanism is operated to advance to move the holder down, and the hub of the medium 2 engages with the rotary shaft 8 and the connecting portion 9 of the spindle motor 7. At the same time, a shutter of the jacket of the medium 2 is opened so that the first magnetic head 17 of the carriage 13 is brought into contact with the recording disk through this opening. Further, as the holder goes down, the head arm 15 is lowered until the second magnetic head 18 is brought into contact with the recording disk of the medium 2 through the opening. Then, the spindle motor 7 rotates the recording disk, and the stepping motor 20 rotates the lead screw 21 to feed or move the first and second magnetic heads 17, 18 in the radial direction of the recording disk by pitches of the recording tracks, thereby making it possible to read signals magnetically. In the case of a working medium or a floppy disk, it is possible to write or read signals by means of the magnetic heads 17, 18.

In the embodiment, the floppy disk unit 1 is so constructed that the medium 2 is loaded with its longitudinal axis or center line deviated in the direction of an arrow B, which is substantially at a right angle to the loading direction A of the medium 2, from the center line of the width W of the unit, and the empty space 10 is formed between the medium 2 and the chassis 3. And, the support plate 6 extends into the empty space 10, and an adjustment portion for effecting timing adjustment of an index signal or, in the embodiment, a variable resistor 25 is mounted on the extended portion of the support plate. That is, the variable resistor 25 is disposed at a position where it is prevented from overlapping the alignment medium 2 inserted through the insertion entrance 5 as viewed in a plan. The timing adjustment may be effected in any way and, for example, the variable resistor 25 serves to effect the timing adjustment of an index signal by changing the reference voltage, varying the output voltage or changing the time constant.

Since the variable resistor 25 is so arranged as not to overlap the loaded medium 2 as viewed in a plan, even when an adjusting tool or, for example, a screw driver is inserted from above, it can be engaged with the variable resistor 25 easily without interfering with the loaded alignment medium 2.

Description will be made on the operation of timing adjustment of index signal in the embodiment.

The floppy disk unit 1 finished through the manufacturing line is put on a pallet (not shown), and the alignment medium 2 is loaded through the insertion entrance 5 into the unit 1 in this state as indicated by the arrow A. On the recording disk of the medium 2 are written not only the signals for radial adjustment (alignment adjustment) and head gap adjustment (azimuth adjustment) of the magnetic heads 17, 18 but also the signal for adjusting the rotating position from the physical reference point to the head gap (index burst signal). Subsequently, connecting pins (not shown) are lowered to be connected to connection terminals of the unit (not shown) so as to supply the necessary electric power and signals. Then, the spindle motor 7 is operated to rotate the recording disk of the medium 2, and the stepping motor 20 is operated to rotate the lead screw 21, so that the carriage 13 and the head arm 15 are moved in the radial direction of the recording disk to move the first and second magnetic heads 17, 18 to the desired track where the index burst signal is written. The magnetic heads 17, 18 magnetically read out the signal from the medium 2 and send the read-out signal to a signal processing circuit (not shown) via a read circuit (not shown), the connection terminals and the connecting pins. The adjusting screw driver is inserted from above and engaged with the index adjustment variable resistor 25, and the adjustment is carried out in accordance with the read-out signal.

As described above, in adjusting the variable resistor, the adjusting tool such as the screw driver can be engaged with the variable resistor 25 from above easily and reliably without involving such a precise and difficult operation that it is engaged with the variable resistor from the back of a base plate through a small hole formed therein for adjustment. Since all of the operations required for the timing adjustment of the index signal can be carried out from above alone, the embodiment described above has many advantages from the viewpoints of facilities, accuracy and cost. Further, the floppy disk unit 1 of this embodiment can be realized with the width W thereof kept as equal as that of the conventional unit since it is constructed such that the alignment medium 2 is loaded to be offset in the direction of the arrow B.

Further, according to the embodiment, by boring the fitting hole 60 in the support plate 6 by means of press work and by caulking the ring-like caulking portion 73 formed integrally with the bearing member 70, the member 70 can be fixed to the support plate 6. The holding force required for the sizing work can be produced at the caulking portion and press-fitting is not required, so that the bearing member can be reduced in height. By setting adequately the relationship between the dimensions of the caulking portion 73 to be filled in the void space 62 and the amount of shear droop of the portion 61, the lower surface of the bearing member 70 becomes substantially flush with the lower surface of the support plate 6, and substantially no projecting portion is formed. Accordingly, it is possible to reduce the overall thickness of the unit all the more. Moreover, since no screw is required to fix the member 70, the number of working steps and the number of component parts can be decreased, thereby making it possible to reduce the cost and weight.

In addition, since the inner peripheral surface of the ring-like caulking portion 73 of the bearing member 70 is inclined at an acute angle with respect to the outer peripheral surface thereof, the caulking portion 73 is caulked relatively easily to fill up the void space 62 with reliability.

Besides, although in the above-described embodiment the medium is offset to the right of the chassis 3 in FIG. 1, it may be located close to the left as well. In this case, the head positioning device 12, the variable resistor 25 and so forth are arranged in the empty space 10 on the right. In case that the empty space 10 is formed along the side of the chassis 3 and the device 12, the variable resistor 25 and the like are arranged in this empty space like the above-described embodiment, there is an advantage that the overall size of the floppy disk unit 1 can be made smaller through a reduction in the depth thereof. However, if the depth is not limited, the variable resistor 25, the head positioning device 12 and the head support device 11 may be arranged in the back of the unit 1 as well. In the above-described embodiment, the medium and the variable resistor 25 are prevented from overlapping each other as viewed in a plan by making use of the empty space 10 formed in the widthwise direction, and however, such arrangement can be realized likewise in other direction than the widthwise direction. Further, the adjustment portion is not limited to the variable resistor 25 but may be any device that it is adjustable. For example, a switch, a trimmer condenser, a device for selecting a resistance by means of a short plug or the like, or a device for effecting the trimming by means of a laser may be alternatively used. In other words, any form or method can be available.

Description will be now made on a floppy disk unit according to the second embodiment of the invention. Component elements of the second embodiment, which may be the same with those of the aforesaid embodiment, are designed by the same reference numerals, and description thereof will be omitted.

Figure 4:
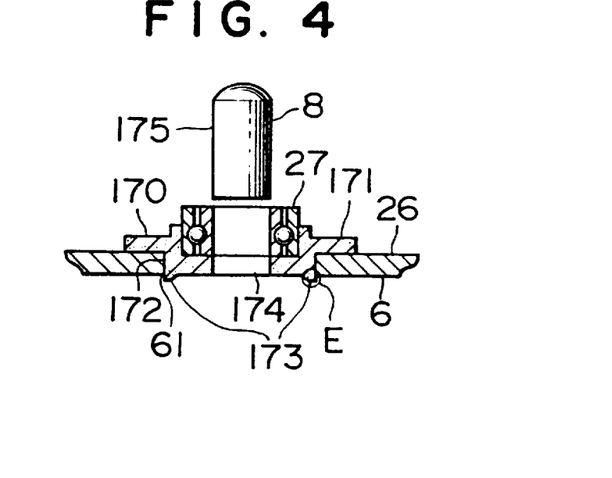
FIG. 4 is a sectional view showing essential portions of a bearing of a floppy disk unit according to a second embodiment of the invention in a state before the bearing member is fixed to the support plate.
Figure 5:
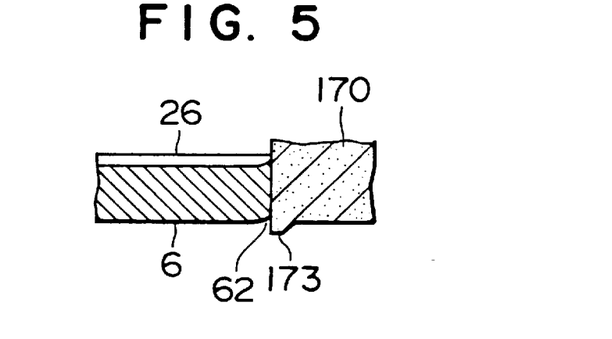
FIG. 5 is an enlarged view showing a part of the essential portions of the bearing of FIG. 3.
Figure 6:
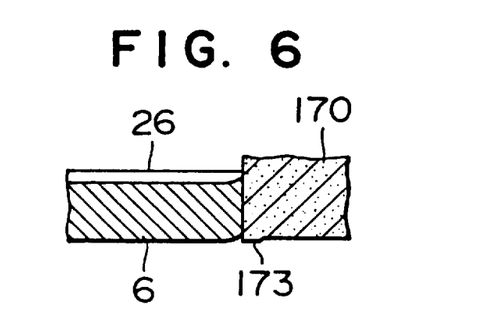
FIG. 6 is a sectional view showing the essential portions of FIG. 4 in a state that the bearing member is fixed to the support plate.
Figure 7:
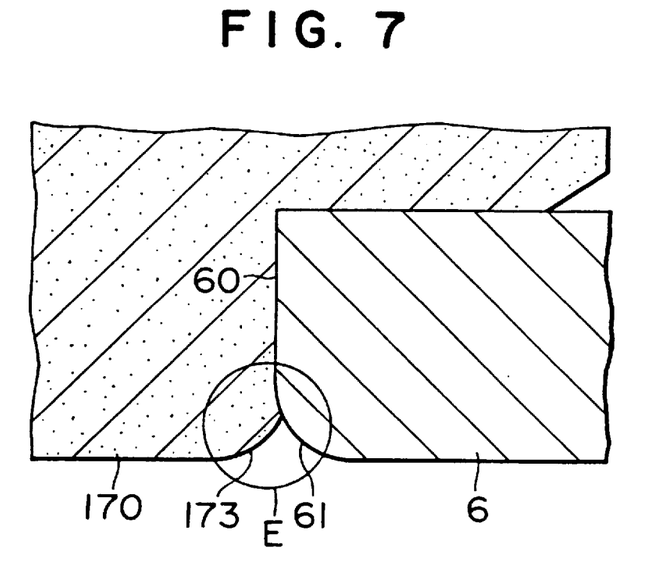
FIG. 7 is a sectional view showing, on an enlarged scale, the essential portions of the bearing of FIG. 4 produced by way of trial.

FIGS. 4 to 6 show the essential portions of a bearing for a spindle motor in the second embodiment. Also in this embodiment, a support plate 6 is formed therein with a fitting hole by means of press work so that a shear-droop portion 61 is formed along the periphery of the fitting hole of the support plate. The support plate 6 is formed on the upper surface thereof with a printed circuit board (PCB) 26. A bearing member 170 is made of a copper-base sintered alloy and is generally in a stepped cylindrical shape that is provided in its upper part with a large diameter portion 171 which has an outside diameter larger than the diameter of the fitting hole of the support plate, and with a small diameter portion 172 which is to be fitted in the fitting hole of the support plate. Further, similarly to the first embodiment, a ring-like caulking portion 173 is formed at the lower end of the small diameter portion 172, and a through hole 174 is formed in the center of the bearing member. In addition, in the large diameter portion 171, a bearing fitting hole 175 that has an diameter larger than that of the through hole 174 is formed concentrically with the through hole 174, so that the bearing member 170 serves as a bearing housing as well.

The bearing member 170 is fixed to the support plate 6 with the ring-like caulking portion 173 caulked radially outwardly to fill up a gap or void space 62 (see FIG. 5) between the small diameter portion 172 and the shear-droop portion 61, similarly to the case of the first embodiment. Moreover, in the second embodiment, a ball bearing 27 is press-fitted in the fitting hole 175 and the outer race thereof is fixed thereto. A rotary shaft 8 is rotatably supported by the ball bearing 27 and the hole 174 of the bearing member 170.

In the embodiment, since the bearing member 70 serves as the bearing housing as well, the member 70 is large in external shape. In other words, the hole 174 for supporting the rotary shaft 8 is distant from the ring-like caulking portion 173. As a result, the hole 174 is hardly deformed even in caulking work, thereby making it possible to omit the sizing work which has been indispensable in the prior art for attaining the required dimensions. This embodiment is applicable to the case where the length over which the bearing member is fixed to and held by the support plate is too short to effect the sizing after the press-fitting. Further, in case of requiring the sizing, even when the thickness of the bearing member is small, the bearing member can be firmly fixed to the support plate 6 through the caulking, and a holding force large enough to withstand the torque needed for the sizing is produced. Additionally, it is possible to mount parts for controlling the motor and the like on the printed circuit board 26 and, accordingly, the number of component parts of the unit can be reduced to thereby simplify the structure of the unit.

The inventor produced the above-described bearing portion by way of trial and took a photograph of the cross section of a part thereof indicated by reference character E in FIG. 4 after effecting the caulking. FIG. 6 shows an illustration from the enlarged photograph (×17) thus taken.

In the trial production, an iron plate was used as the support plate 6, the thickness of the iron plate was 0.6 mm and the diameter (at the straight portion) of the fitting hole 60 was 14 mm. The bearing member 170 was made of a copper-base sintered alloy NY-105, product of NIPPON KAGAKU YAKIN Co., Ltd. The diameter of the through hole 174 of the bearing member was about 4 mm and the dimensions of the ring-like caulking portion 173 were 1 mm in width, 60 degrees in inclination a and 0.7 mm in 10 height. Further, a US-1 MODEL caulking machine, product of YOSHIKAWA IRON WORKS Co., Ltd., was used at an air pressure of 3 Kg/cm$^2$ to caulk the ring-like caulking portion 173.

FIG. 6 clearly shows the state that the ring-like caulking portion 173 is filled in the gap 62. After the caulking, the ring-like caulking portion 173 projected downward beyond the support plate 6 only by 0.1 mm so that the lower surface of the support plate 6 and the lower end of the bearing member 170 were substantially flush with each other. It will be clearly seen from FIG. 6 that the bearing member 170 is fixed with substantially no projecting portion formed. Concerning the through hole 174 of the bearing member, no change was observed in the inside diameter thereof before and after the caulking work. Further, the length over which the bearing member is held was as well as about 0.06 mm, but a force of about 20 Kg was required to extract the bearing member, and accordingly, the holding force according to the invention was improved by about four times as compared with an extracting force of about 5 Kg for the conventional press-fitting.

The second embodiment has the following advantages in addition to the advantages of the first embodiment described before. When the support plate 6 is made of magnetic material such as iron or silicon steel plate, the support plate can be used as a back yoke of the motor. Further, when the support plate is formed by iron PCB or silicon PCB which is provided with the printed circuit board, the magnetic circuit and the electric circuit of the motor can be realized as one body, and accordingly, the number of component parts of the unit can be reduced. Since the bearing member 170 is made of a copper-base sintered alloy and is formed in the upper part thereof with the fitting hole 175 for the ball bearing, it is possible to disuse a separate bearing housing and, moreover, it is possible to enjoy the each of caulking and the excellent characteristics of the bearing to the rotary shaft made of stainless steel. The bearing member of copper-base sintered alloy is generally burned at a lower temperature than that required for iron-base sintered alloy so that the accuracy of the dimensions can be obtained easily, the accuracy of the degree of concentricity between the bearing fitting hole 175 and the through hole 174 can be increased and hence the accuracy of the bearing can be improved.

Although the second embodiment has been described in regard to the bearing portion alone, the other portions of the unit may be the same as those of the first embodiment. Incidentally, as seen from the foregoing description, the improvements of the adjustment portion and the bearing portion according to the invention may be applied independently of each other.

The invention has been described above in conjunction with the embodiments, and however, it should be appreciated that the invention is not limited solely to these specific forms and various changes and modifications can be made to the described forms or the invention can be embodied in other forms without departing from the scope of the appended claims.

What is claimed is:

1. A floppy disk unit for reading information from and recording information on a medium loaded therein, the floppy disk unit comprising:

a chassis comprising a plurality of sides including a front side, defining an outer contour of the unit, said front side having an opening for insertion of the medium into said chassis;

a spindle motor disposed in said chassis for engaging and rotating the medium, said spindle motor being laterally offset from a center of said front side of said chassis so that a space is provided between a side of the medium loaded in the unit and a corresponding one of the plurality sides of said chassis;

a head mechanism including at least one magnetic head for reading and writing the information and an elongated driving device for moving said magnetic head relative to the medium under control of an index signal, said elongated driving device lying in said space along a direction of insertion of the medium; and adjust means for effecting timing adjustment of the index signal, said adjust means being arranged in said space for direct contact from above said chassis for mechanically effecting the timing adjustment of the index signal, said adjust means being disposed at a position where said adjust means is prevented from being in an overlapping relationship with the medium loaded in the floppy disk unit.

2. A unit according to claim 1, wherein:

said elongated driving device comprises a stepper motor and a lead screw connected to said stepper motor for rotation of the lead screw by the stepper motor;

said head mechanism further comprises a carriage extending between said lead screw and the medium loaded in the unit substantially perpendicularly to the direction of insertion of the medium;

said carriage has an end which is drivingly engaged with said lead screw; and said magnetic head is mounted on another end of said carriage.

3. A unit according to claim 1, further comprising a support plate having an electric circuit formed thereon and installed in said chassis, wherein said spindle motor, said elongated driving device and said adjust means are mounted on said support plate and said spindle motor and said adjust means are electrically connected to said electric circuit.

4. A unit according to claim 1, wherein the medium is a 3.5" floppy disk.

5. A unit according to claim 1, wherein the adjust means comprises a variable resistor.

6. A unit according to claim 5, wherein the variable resistor is mechanically adjustable with a tool.

7. A unit according to claim 6, wherein the position at which the adjust means is disposed is selected such that when the medium is loaded in the floppy disk unit, the variable resistor is arranged for direct contact from above the chassis with the tool without interference with the medium.

8. A unit according to claim 6, wherein the tool is a screwdriver.

9. A unit according to claim 1, wherein the adjust means is mechanically adjustable with a tool.

10. A unit according to claim 9, wherein the position at which the adjust means is disposed is selected such that when the medium is loaded in the floppy disk unit, the adjust means is arranged for direct contact from above the chassis with the tool without interference with the medium.

11. A unit according to claim 9, wherein the tool is a screwdriver.

* * * * *